(12) United States Patent
Allgaeuer et al.

(10) Patent No.: US 11,878,565 B2
(45) Date of Patent: Jan. 23, 2024

(54) AIR-CONDITIONING SYSTEM FOR AN ELECTRICALLY DRIVABLE MOTOR VEHICLE, HAVING A COOLING BODY AND A HEATING DEVICE, MOTOR VEHICLE, AND METHOD FOR OPERATING AN AIR-CONDITIONING SYSTEM

(71) Applicant: Bayerische Motoren Werke Aktiengesellschaft, Munich (DE)

(72) Inventors: Christian Allgaeuer, Munich (DE); Alexander Lichtenberger, St. Peter in der Au (AT); Christian Schardax, Garsten Nord (AT); Alexander Schulze, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 17/669,617

(22) Filed: Feb. 11, 2022

(65) Prior Publication Data
US 2022/0258559 A1    Aug. 18, 2022

(30) Foreign Application Priority Data
Feb. 15, 2021   (DE) ...................... 10 2021 103 483.3

(51) Int. Cl.
*B60H 1/00*    (2006.01)
(52) U.S. Cl.
CPC ..... *B60H 1/00278* (2013.01); *B60H 1/00385* (2013.01); *B60H 1/00899* (2013.01);
(Continued)
(58) Field of Classification Search
CPC ............ B60H 1/00278; B60H 1/00385; B60H 1/00899; B60H 2001/00307;
(Continued)

(56) References Cited

U.S. PATENT DOCUMENTS 5,039,927 A * 8/1991 Centafanti ................ H02J 7/00
429/62
5,055,656 A * 10/1991 Farah ................ H02J 7/007194
219/209

(Continued)

FOREIGN PATENT DOCUMENTS

DE         102013217739 A1 *  3/2014  ............... B60H 1/00
DE    10 2012 019 943 A1     4/2014
(Continued)

OTHER PUBLICATIONS

German-language Search Report issued in German Application No. 10 2021 103 483.3 dated Sep. 22, 2021 with partial English translation (12 pages).

*Primary Examiner* — Ljiljana V. Ciric
(74) *Attorney, Agent, or Firm* — Crowell & Moring LLP

(57) ABSTRACT

An air-conditioning system for an electrically drivable motor vehicle includes a first vehicle component to be temperature-controlled, a second vehicle component to be temperature-controlled, which is arranged on at least one cooling body, and a heat transport medium-carrying first circuit, which is provided for controlling the temperature of the vehicle components and to which the first vehicle component and the at least one cooling body of the second vehicle component are connected. A heating device which is configured to release heating energy to the heat transport medium is arranged on the at least one cooling body, wherein via the heat transport medium, the heating energy can be transported at least partially to the first vehicle component for the purpose of heating the first vehicle component.

15 Claims, 2 Drawing Sheets

(52) U.S. Cl.
CPC .............. *B60H 2001/00307* (2013.01); *B60H 2001/00928* (2013.01)

(58) Field of Classification Search
CPC ........... B60H 2001/00928; B60L 58/26; B60L 58/27; H01M 10/613; H01M 10/615; H01M 10/625; H01M 10/663
See application file for complete search history.

(56) References Cited

U.S. PATENT DOCUMENTS

| | | | | |
|---|---|---|---|---|
| 5,281,792 | A * | 1/1994 | Lee | H05B 3/30 219/209 |
| 5,731,568 | A * | 3/1998 | Malecek | H01M 10/6567 180/68.5 |
| 8,336,319 | B2 * | 12/2012 | Johnston | B60K 11/04 62/434 |
| 8,753,762 | B2 * | 6/2014 | Major | B60H 1/00385 62/238.7 |
| 9,048,463 | B2 * | 6/2015 | Lappe | H01M 10/6563 |
| 9,203,127 | B2 * | 12/2015 | Hioki | H01M 10/6571 |
| 9,421,845 | B2 * | 8/2016 | Khelifa | B60H 1/005 |
| 9,819,063 | B2 * | 11/2017 | Blatchley | B60H 1/00385 |
| 9,890,666 | B2 * | 2/2018 | Zhou | F01K 23/101 |
| 9,947,975 | B2 * | 4/2018 | Porras | H01M 10/625 |
| 9,950,638 | B2 * | 4/2018 | Porras | B60L 58/26 |
| 10,220,722 | B2 * | 3/2019 | Lewis | B60K 6/40 |
| 10,293,706 | B2 * | 5/2019 | Porras | B60H 1/00385 |
| 10,302,331 | B2 * | 5/2019 | Kohl | B60H 1/2221 |
| 10,399,413 | B2 * | 9/2019 | Derx | B60H 1/241 |
| 10,403,946 | B2 * | 9/2019 | Jalilevand | B60H 1/00885 |
| 10,461,383 | B2 * | 10/2019 | Haag | H01M 50/264 |
| 10,629,860 | B2 * | 4/2020 | Schröder | H01M 10/625 |
| 10,749,225 | B2 * | 8/2020 | Robert | H01M 50/291 |
| 10,875,381 | B2 * | 12/2020 | Schoeneman | B60H 1/143 |
| 10,889,164 | B2 * | 1/2021 | McCarthy | F24H 9/1827 |
| 10,960,785 | B2 * | 3/2021 | Villanueva | H01M 10/6552 |
| 11,167,643 | B2 * | 11/2021 | Li | B60L 15/20 |
| 11,214,114 | B2 * | 1/2022 | Smith | B60H 1/143 |
| 11,342,603 | B2 * | 5/2022 | Tomai | B60L 58/25 |
| 11,407,275 | B2 * | 8/2022 | Durrani | B60H 1/32284 |
| 11,407,330 | B2 * | 8/2022 | Cheadle | H01M 10/6568 |
| 11,472,255 | B2 * | 10/2022 | Tisdale | B60H 1/00921 |
| 11,541,715 | B2 * | 1/2023 | Huang | B62D 21/17 |
| 11,541,719 | B1 * | 1/2023 | Richardson | B60H 1/00485 |
| 11,688,903 | B2 * | 6/2023 | Porras | H01M 10/6569 62/118 |
| 11,731,482 | B2 * | 8/2023 | Huang | B60K 1/04 165/202 |
| 11,760,165 | B2 * | 9/2023 | Chu | B60H 1/2221 165/202 |
| 11,766,953 | B2 * | 9/2023 | Cox | H01M 10/625 429/71 |
| 2012/0304674 | A1 * | 12/2012 | Schwarzkopf | B60H 1/00878 62/238.1 |
| 2013/0209856 | A1 * | 8/2013 | Lev | H01M 10/625 429/120 |
| 2014/0070013 | A1 * | 3/2014 | Stanek | B60L 58/27 237/28 |
| 2015/0221995 | A1 * | 8/2015 | Robert | H01M 10/625 429/120 |
| 2015/0325893 | A1 * | 11/2015 | Burrows | H01M 10/615 429/120 |
| 2016/0069588 | A1 * | 3/2016 | Kominami | F24H 1/142 236/35 |
| 2016/0254577 | A1 * | 9/2016 | Ciampolini | H01M 10/613 318/139 |
| 2017/0008375 | A1 * | 1/2017 | Blatchley | H01M 10/615 |
| 2017/0197488 | A1 * | 7/2017 | Kim | H01M 10/625 |
| 2018/0114955 | A1 * | 4/2018 | Robert | H01M 50/124 |
| 2020/0039324 | A1 * | 2/2020 | Adachi | F24H 1/10 |
| 2020/0062082 | A1 * | 2/2020 | Hermida Domínguez | H05B 1/0236 |
| 2020/0156443 | A1 * | 5/2020 | Ding | H05B 3/42 |
| 2020/0317027 | A1 * | 10/2020 | Chu | B60H 1/00878 |
| 2020/0331504 | A1 * | 10/2020 | Glinka | B61C 3/02 |
| 2021/0070147 | A1 * | 3/2021 | Chae | F24H 9/20 |
| 2021/0119282 | A1 * | 4/2021 | Wünsche | H01M 10/6568 |
| 2022/0281353 | A1 * | 9/2022 | Cheadle | F28D 1/0358 |
| 2022/0336883 | A1 * | 10/2022 | Galvis | H01M 10/6554 |
| 2022/0339989 | A1 * | 10/2022 | Herbolzheimer | H01M 10/63 |
| 2023/0104065 | A1 * | 4/2023 | Frank | B60H 1/00392 165/202 |
| 2023/0268577 | A1 * | 8/2023 | Groß | B60L 50/66 429/120 |

FOREIGN PATENT DOCUMENTS

| | | | | |
|---|---|---|---|---|
| DE | 102014201747 | A1 * | 8/2014 | ......... B60H 1/00278 |
| DE | 102015101186 | A1 * | 7/2016 | |
| DE | 10 2018 001 498 | A1 | 8/2018 | |
| DE | 102017120164 | A1 * | 3/2019 | |
| DE | 20 2019 102 689 | U1 | 6/2019 | |
| DE | 102019215846 | A1 * | 4/2021 | ......... B60H 1/00278 |
| DE | 102021103483 | A1 * | 8/2022 | ......... B60H 1/00278 |
| DE | 102021127770 | A1 * | 4/2023 | |
| FR | 3005898 | A1 * | 11/2014 | ......... B60H 1/00278 |

* cited by examiner

AIR-CONDITIONING SYSTEM FOR AN ELECTRICALLY DRIVABLE MOTOR VEHICLE, HAVING A COOLING BODY AND A HEATING DEVICE, MOTOR VEHICLE, AND METHOD FOR OPERATING AN AIR-CONDITIONING SYSTEM

CROSS REFERENCE TO RELATED APPLICATION

This application claims priority under 35 U.S.C. § 119 from German Patent Application No. 10 2021 103 483.3, filed Feb. 15, 2021, the entire disclosure of which is herein expressly incorporated by reference.

BACKGROUND AND SUMMARY OF THE INVENTION

The invention relates to an air-conditioning system for an electrically driveable motor vehicle. The air-conditioning system has a first vehicle component to be temperature-controlled, a second vehicle component to be temperature-controlled and a heat transport medium-carrying first circuit, which is provided for controlling the temperature of the vehicle components. The invention also relates to an electrically driveable motor vehicle, and to a method for operating an air-conditioning system.

The focus of interest here is on air-conditioning systems for electrically driveable motor vehicles, that is to say hybrid vehicles or electric vehicles. Electrically driveable motor vehicles have an electric drivetrain, which normally has at least one electric traction machine or drive machine and a rechargeable traction battery, for example a high-voltage energy store, for providing a supply of energy to the electric drive machine. Here, the air-conditioning systems serve for carrying out various temperature-control tasks in the motor vehicle, that is to say the supply or discharge of heat of various vehicle components, to ensure an optimum operation of the motor vehicle.

For an optimum operation of the motor vehicle, the temperature control of the traction battery, for example, is of particular importance. For the purpose of temperature control, that is to say for the purpose of heating and cooling the traction battery, the traction battery is generally incorporated into a heat transport medium-carrying circuit of the air-conditioning system of the motor vehicle. Said circuit for heating the traction battery normally has a separate heater. Such a heater constitutes an additional vehicle component and consequently increases the costs and the structural space requirement of the air-conditioning system in the motor vehicle. It is also already known to use power losses of other vehicle components for heating the traction battery. This, however, is often inefficient.

It is an object of the present invention to provide a solution by way of which vehicle components of an electrically driveable motor vehicle can be temperature-controlled in an efficient and inexpensive manner.

This object is achieved according to the claimed invention.

An air-conditioning system according to an embodiment of the invention for an electrically driveable motor vehicle has a first vehicle component to be temperature-controlled, a second vehicle component to be temperature-controlled, which is arranged on at least one cooling body, and a heat transport medium-carrying first circuit, which is provided for controlling the temperature of the vehicle components and to which the first vehicle component and the at least one cooling body of the second vehicle component are connected. A heating device which is configured to release heating energy to the heat transport medium is arranged on the at least one cooling body, wherein, via the heat transport medium, the heating energy can be transported at least partially to the first vehicle component for the purpose of heating the first vehicle component.

The invention moreover includes a method for operating an air-conditioning system according to an embodiment of the invention. This method involves determining a heating requirement of the first vehicle component, controlling the heating device for discharge of heating energy, and controlling the coolant flow in the first circuit in such a way that the heating energy released to the heat transport medium via the at least one cooling body is transported at least partially from the second vehicle component to the first vehicle component by way of the heat transport medium.

The invention moreover relates to an electrically driveable motor vehicle comprising an air-conditioning system according to an embodiment of the invention. The motor vehicle is in particular in the form of a passenger motor vehicle. The motor vehicle has an electric drivetrain, which has in particular a rechargeable traction battery or a traction accumulator, for example a high-voltage energy store, an electric traction machine and corresponding power electronics, for example an inverter.

The air-conditioning system is configured for use in a motor vehicle. Here, the air-conditioning system can be operated in different operating modes, that is to say different heating modes and different cooling modes. The different operating modes can be provided by a control device of the air-conditioning system. The control device may be integrated into one or more control units of the motor vehicle.

The air-conditioning system has the first circuit, which is configured for circulation of a heat transport medium and for this purpose has in particular corresponding lines and at least one pump. The heat transport medium may for example be a coolant, for example a water/glycol mixture, or a refrigerant. The first circuit has the two vehicle components. The first circuit may, via actuating elements, for example valves, also be connected to other heat transport medium-carrying circuits of the air-conditioning system. Preferably, the first vehicle component is the traction battery of the motor vehicle, and the second vehicle component is an electronics component which has in particular the power electronics which are connected electrically to the traction battery. Beside the power electronics, the electronics component may also have further components, for example a DC/DC converter, a charging unit, control units, etc. The second vehicle component is arranged on at least one cooling body, that is to say coupled thermally to the at least one cooling body. The second vehicle component may also be distributed over multiple cooling bodies. In the case of the electronics component, structural elements of the electronics component, for example, may be attached to a surface of the cooling body. The at least one cooling body is connected to the first circuit. For the purpose of cooling the second vehicle component, the latter can release its waste heat to the at least one cooling body, which releases the waste heat to the heat transport medium. Here, the heat transport medium can flow through the at least one cooling body. It may however also be the case that the at least one cooling body is a passive cooling body, which is arranged for example on the heat transport medium lines of the first circuit. The second vehicle component is connected via the at least one cooling body to the first circuit for the purpose of cooling the second vehicle component.

The first vehicle component is likewise connected to the first circuit. For example, the first vehicle component may likewise have a further cooling body which is connected to the first circuit. In the case of the traction battery, this may have as the further cooling body for example a cooling plate through which heat transport medium flows and which, for the purpose of cooling battery cells of the traction battery, is arranged on the battery cells. The electronics component and the at least one cooling body on which the electronics component is arranged may be arranged for example together with the battery cells in a battery housing of the traction battery. It may however also be provided that the electronics component is formed separately from the traction battery. For the purpose of cooling the vehicle components, a chiller or a refrigeration machine may be connected to the first circuit, this being configured to transport from the first circuit the waste heat released to the heat transport medium by the respective vehicle component. The cooling body is arranged in the first circuit in particular upstream of the chiller and downstream of the first vehicle component.

In order to be able to heat the first vehicle component, the heating device is arranged on the at least one cooling body assigned to the second vehicle component. Here, the heating device may have at least one heating element, which may be arranged on or in a surface of the at least one cooling body or else may be arranged in, or inserted into, a cooling duct of the at least one cooling body through which the heat transport medium flows. Here, the electronics component may have connections for the heating device such that this can be supplied with electrical energy, for example from the traction battery. In case the heating device is supplied with energy from a high-voltage battery, the heating device is able to provide a particularly high heating power. The at least one heating element is in particular a PTC heating element. Such a PTC heating element has the advantage that it is self-limiting, that is to say, even in the event of a defect of the heating element, a temperature provided by the heating element does not exceed a predetermined maximum value. Moreover, such a heating element can be operated in a simple manner, for example by being connected to the energy supply via a controllable switch.

The control device of the air-conditioning system is configured in particular to control the heating device for release of the heating energy to the cooling body. In the activated state of the heating device, the latter releases the heating energy or heat. The fact that the at least one cooling body is connected to the heat transport medium-carrying first circuit means that the heating energy is released, via the at least one cooling body or directly, to the heat transport medium and is transported onward through the cooling lines. The control device may, for example, control the heat transport medium flow in the first circuit for transportation of the heating energy to the first vehicle component. For example, for this purpose, the control device may activate a corresponding pump for conveying the heat transport medium and possibly actuate particular actuating elements or valves in order to connect the first vehicle component and the second vehicle component fluidically in series with the cooling body.

Such a heating device arranged on the cooling body has particularly high efficiency. The good thermal coupling between the heat transport medium and the heating device via the cooling body makes it advantageously possible to dispense with an additional costly heater, taking up a large amount of structural space, for example an electric flow heater (EFH), in the first circuit.

Preferably, the at least one cooling body is a cooling plate through which heat transport medium can flow. In the case of the cooling plate supporting, as the second vehicle component, the electronics component, that is to say for example the inverter, the DC/DC converter, the charging unit, control units, etc., this has relatively large dimensions, for example at least 80 cm*30 cm, and thus a large area which is usable for temperature control. The cooling plate has surfaces in the form of a top side and a bottom side, between which cooling ducts for carrying the heat transport medium are formed. Structural elements of the second vehicle component are arranged on one of the surfaces, for example the top side. The heating device has in particular at least one areal heating element which is arranged on or in at least one of the surfaces of the at least one cooling body, for example the cooling plate, and consequently releases the heating energy to the heat transport medium via the at least one cooling body. In the case of the heating device being inserted into the cooling ducts, it is able to release the heating energy directly to the heat transport medium. The areal heating element may be arranged for example between the surface of the at least one cooling body and the second vehicle component. Alternatively or additionally, an areal heating element may be arranged on a first surface of the at least one cooling body, while the second vehicle component is arranged on an opposite second surface of the at least one cooling body.

The areal heating element may for example be a heating wire which is arranged on or in the surface of the at least one cooling body or which is inserted into the cooling duct. For the purpose of lengthening the heating path formed by the heating wire, the heating wire may be arranged for example in a meandering manner in or on the surface. Particularly preferably, the at least one heating element is however a heating film which extends in particular over at least 50%, preferably at least 90%, of the surface of the at least one cooling body. The heating film may have for example two thin tiers of plastic between which an electrically conductive layer lies. The layer may comprise for example carbon paste. The heating foil may be arranged for example by vapor deposition on the surface of the at least one cooling body. The fact that the cooling plate has a large area which is usable for temperature control means that the heating film, too, may take up a large area on the surface of the cooling plate and consequently provide a particularly high heating power for heating the first vehicle component. Moreover, such a heating film has a low structural space requirement, so that the heating device is of particularly space-saving form.

It proves to be advantageous if the air-conditioning system has at least one third vehicle component which is coupled thermally to the first circuit, wherein the heating energy provided by the heating device can be transferred partially to the at least one third vehicle component for the purpose of heating the at least one third vehicle component. Thus, the heat provided by the heating device may be divided in any desired manner between the vehicle components, for example by the control device in a manner dependent on the heating requirement of the vehicle components. Here, the third vehicle component may be a component which is connected directly to the first circuit. Such a component may for example be a heating condenser for heating an interior compartment of the motor vehicle.

The at least one third component may also be a second heat transport medium-carrying circuit of the air-conditioning system that is coupled thermally to the first circuit, wherein the first circuit and the second circuit carry a coolant as the heat transport medium, and the heating energy provided by the heating device can be transferred partially to the second circuit for the purpose of heating the second circuit. The second circuit is configured in particular for controlling the temperature of the interior compartment of the motor vehicle. Here, the heating energy of the heating device is released to the coolant circulating in the second circuit. For the purpose of transfer of the heating power from the coolant circulating in the second circuit into the interior compartment or the passenger cell of the motor vehicle, a heat exchanger, for example, may be connected to the second circuit.

It may also be provided that the air-conditioning system has a refrigerant-carrying refrigeration circuit via which the coolant-carrying first circuit and the coolant-carrying second circuit are thermally coupled, wherein the heating energy can be transferred from the first circuit into the second circuit via the refrigeration circuit. For example, the chiller of the first circuit, which is also connected to the refrigeration circuit, and a condenser, for example a water-cooled condenser, which is connected to the second circuit may be operated during a heat pump operation in which heat, for example the heating energy of the heating device, is transferred from the first circuit into the second circuit. Alternatively or additionally, the first circuit and the second circuit may also be coupled thermally via a heat exchanger.

The embodiments presented with regard to the air-conditioning system according to an embodiment of the invention, and the advantages thereof, apply correspondingly to the motor vehicle according to an embodiment of the invention and to the method according to an embodiment of the invention.

Further features of the invention emerge from the claims, the figures and the description of the figures. The features and combinations of features mentioned above in the description and the features and combinations of features mentioned below in the description of the figures and/or shown in the figures alone can be used not only in the in each case stated combination, but also in other combinations or by themselves.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical and functionally identical elements are denoted by the same reference signs.

Figure 1:
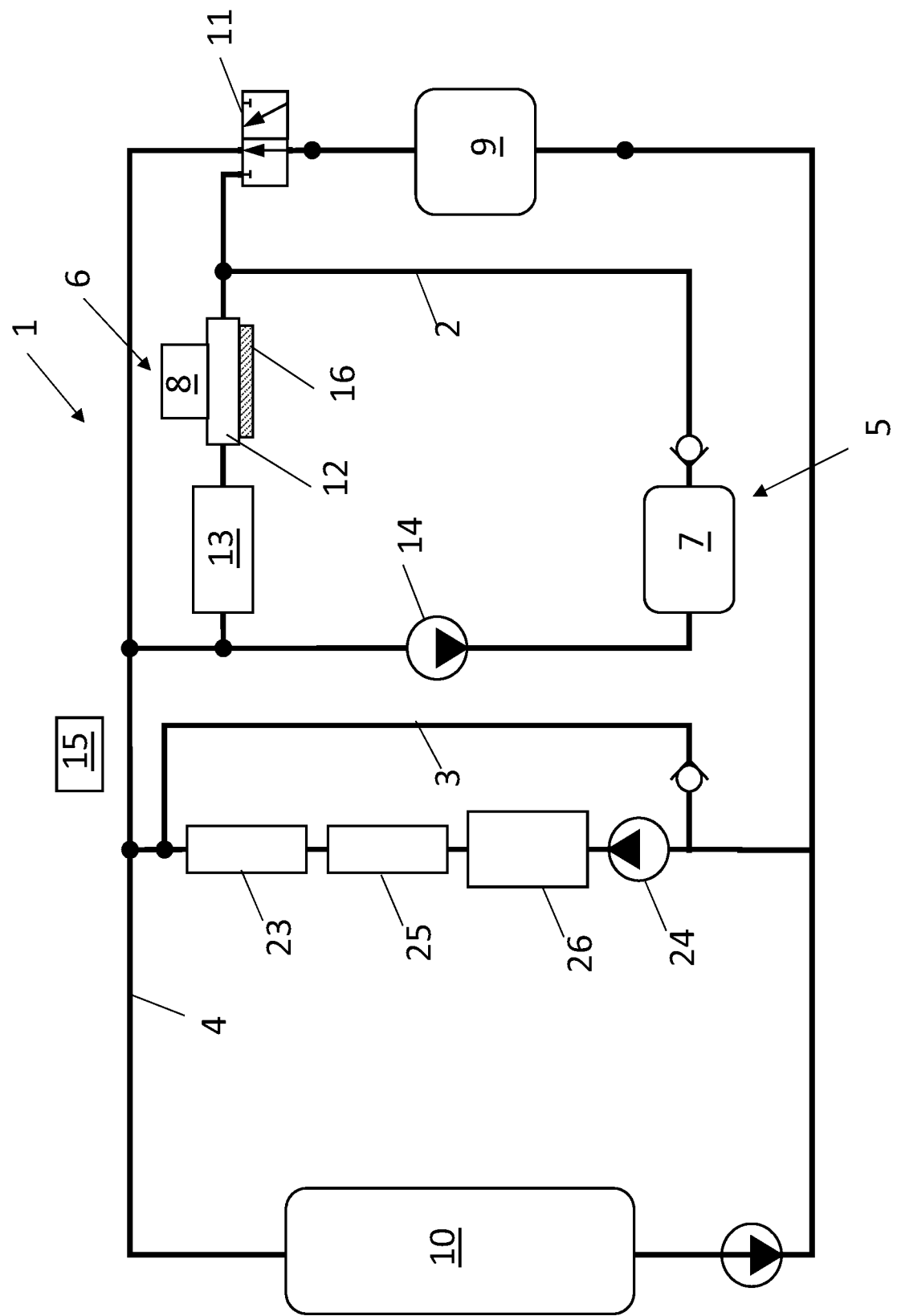
FIG. 1 shows a schematic illustration of an embodiment of an air-conditioning system according to the invention.

FIG. 1 shows in simplified form an embodiment of an air-conditioning system 1 for an electrically driveable vehicle (not shown here). Here, the air-conditioning system 1 has a heat transport medium-carrying first circuit 2, a heat transport medium-carrying second circuit 3 and a heat transport medium-carrying third circuit 4. Here, the first circuit 2, the second circuit 3 and the third circuit 4 carry a coolant or cooling fluid as the heat transport medium. Alternatively, the circuits 2, 3, 4 could also carry a refrigerant as the heat transport medium. Two vehicle components 5, 6 are connected to the first circuit 2. Here, the first vehicle component 5 is a traction battery 7 of the motor vehicle, and here, the second vehicle component 6 is an electronics component 8 of the motor vehicle. The electronics component 8 may have for example an inverter which is connected electrically to the traction battery 7 and to an electric drive machine 9, the latter being connected here to the third circuit 4. For the purpose of cooling the electric drive machine 9, an environment cooling device 10 is connected to the third circuit 4, via which environment cooling device the waste heat of the drive machine 9 can be discharged to an environment of the motor vehicle. Here, the first circuit 2 and the third circuit 4 may be coupled fluidically, and thus thermally, via a valve device 11. Here, further possible pumps, valve devices, for example shut-off valves, bypasses, etc. of the circuits 2, 3, 4 are either not illustrated or not described in any more detail.

For the purpose of cooling the second vehicle component 6, the latter is arranged here on a cooling body 12. The cooling body 12 is connected to the first circuit 2. The waste heat of the second vehicle component 6 can consequently be released via the cooling body 12 to the coolant of the first circuit 2. The first vehicle component 5, too, may have a cooling body (not shown here), via which the first vehicle component 5, for the purpose of cooling, is connected to the first circuit 2. In order to be able to discharge from the first circuit 2 the waste heat of the vehicle components 5, 6 that is transported by the coolant, a chiller 13 is moreover connected here to the first circuit 2. The chiller 13 is coupled to a refrigeration circuit (not shown here) of the air-conditioning system 1, in which a refrigerant circulates. Here, for the purpose of conveying the coolant in the first circuit 2, a pump 14 is moreover arranged in the circuit 2, said pump being able to be controlled by a control device 15 of the air-conditioning system 1.

Figure 2:
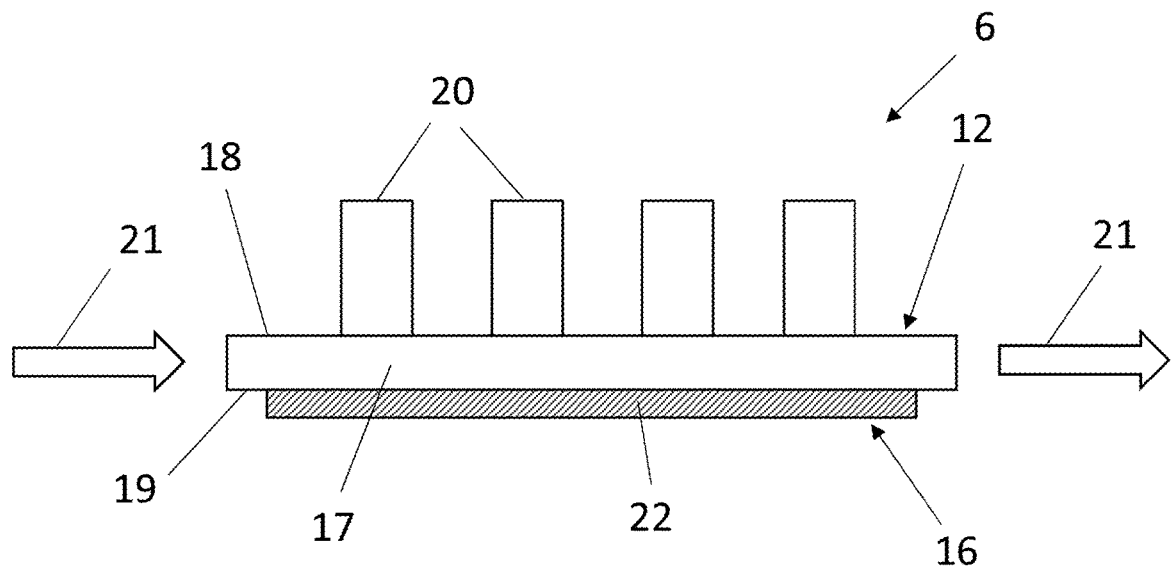
FIG. 2 shows a schematic illustration of the second vehicle component, the cooling body and the heating device according to a first embodiment.
Figure 3:
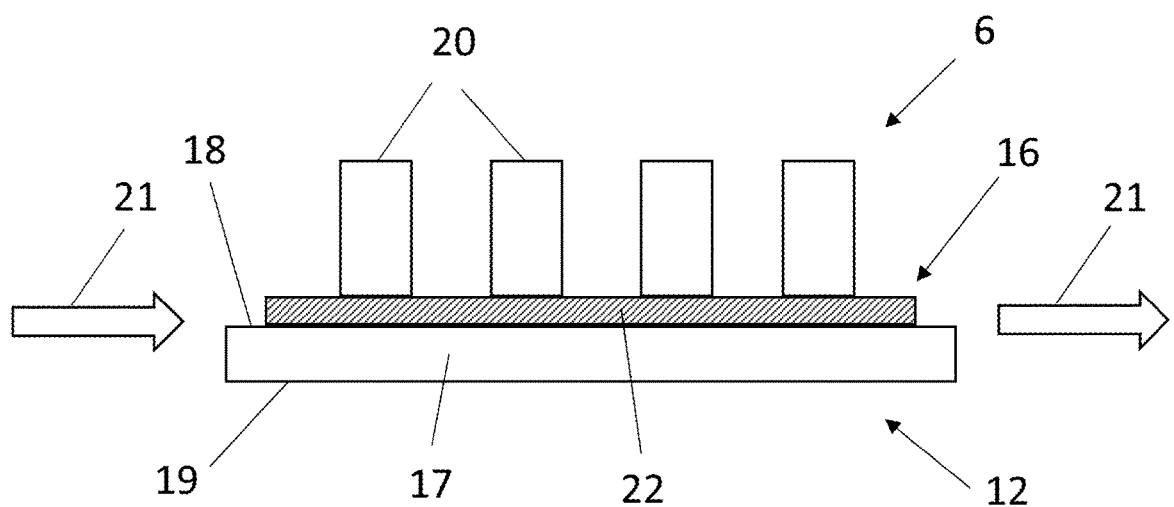
FIG. 3 shows a schematic illustration of the second vehicle component, the cooling body and the heating device according to a second embodiment.

Since, for the optimum operation of the first vehicle component 5, it may also be necessary for the latter to be heated, a heating device 16 is also connected to the first circuit 2, which heating device is able to feed heating energy into the coolant and thus into the first circuit 2. For this purpose, the heating device 16 is arranged on the cooling body 12, which supports the second vehicle component 6. FIGS. 2 and 3 show different possible arrangements of the heating device 16 on the cooling body 12. The cooling body 12 is designed in particular as a cooling plate 17 with a surface in the form of a top side 18 and a bottom side 19. Structural elements 20 of the second vehicle component 6 are arranged on one of the surfaces 18, 19 (the top side 18 in this case). The cooling plate 17 is arranged in a flow path 21 of the coolant. For example, the cooling plate 17 may have cooling ducts through which the coolant flows. Here, the heating device 16 has at least one heating film 22 which is arranged in a manner bearing against at least one of the surfaces 18, 19. As per FIG. 2, the heating film 22 is arranged on the bottom side 19 of the cooling plate 17, so that the cooling plate 17 is arranged between the second vehicle component 5 and the heating film 22. As per FIG. 3, the heating film 22 is arranged on the top side 18 between the second vehicle component 5 and the cooling plate 17. The heating film 22 may be fastened for example by vapor deposition to the respective surface 18, 19. Owing to the small thickness of the heating film 22, this can be arranged in a particularly space-saving manner in the air-conditioning system 1.

The heating device 16 can be controlled and activated by the control device 15. The heating device 16 subsequently releases heating energy to the cooling body 12, via which the heating energy is fed into the coolant. The control device 15 moreover activates the pump 14 in order for the coolant to be conveyed from the second vehicle component 6 to the first vehicle component 5. In this way, the heating energy is transported to the first vehicle component 5 in order to heat the latter. In particular no further heating device, in particular no electric flow heater, is connected to the first circuit 2.

Here, the heating energy may be transported completely or only partially to the first vehicle component 5. A part of the heating energy may also be fed into the second circuit 3. Here, the second circuit 3 is configured for controlling the temperature of an interior compartment of the motor vehicle. The heating energy transferred into the second circuit 3 may therefore be used to heat the interior compartment. For this purpose, a heat exchanger 23, for example, may be connected to the second circuit 3, via which heat exchanger the heat transported into the second circuit 3 can be discharged to the interior compartment. For the purpose of conveying the coolant in the second circuit 3, a further pump 24 is connected thereto. An additional heater 25 may also be connected to the second circuit 3.

The first circuit 2 and the second circuit 4 are thermally coupled. Here, the thermal coupling is realized via a heat pump which is formed by way of the chiller 13 of the first circuit 2, the refrigeration circuit and a condenser 26 of the second circuit 3. During heat pump operation, the chiller 13 can release heat to the condenser 26 via the refrigeration circuit. The fact that the second vehicle component 5 is arranged with the cooling body 12 upstream of the chiller 13 in the first circuit 2 and the chiller 13 is thus arranged between the cooling body 12 and the first vehicle component 5 means that the control device 15 can control a portion of the heating energy that is discharged from the first circuit 2 to the second circuit 3 via the chiller 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-conditioning system for an electrically driveable motor vehicle, the air-conditioning system comprising:
    a first vehicle component to be temperature-controlled,
    a second vehicle component to be temperature-controlled, wherein the second vehicle component is arranged on at least one cooling body, and
    a heat transport medium-carrying first circuit, which is provided for controlling a temperature of the first vehicle component and the second vehicle component, and to which the first vehicle component and the at least one cooling body of the second vehicle component are connected,
    wherein a heating device which is configured to release heating energy to the heat transport medium is arranged on the at least one cooling body, wherein, via the heat transport medium, the heating energy is transportable at least partially to the first vehicle component to heat the first vehicle component.

2. The air-conditioning system according to claim 1, further comprising a control device which is configured to control the heating device for release of the heating energy to the at least one cooling body and to control a heat transport medium flow in the first circuit for transportation of the heating energy to the first vehicle component.

3. The air-conditioning system according to claim 1, wherein the first vehicle component is a traction battery of the motor vehicle, and the second vehicle component is an electronics component which has power electronics which are connected electrically to the traction battery.

4. The air-conditioning system according to claim 1, wherein the at least one cooling body is a cooling plate through which heat transport medium is flowable.

5. The air-conditioning system according to claim 1, wherein the heating device comprising at least one heating element which is arranged on or in at least one surface of the at least one cooling body or which is integrated into the at least one cooling body.

6. The air-conditioning system according to claim 5, wherein the at least one heating element is in a form of a heating film which extends in particular over at least 50% of the at least one surface of the cooling body.

7. The air-conditioning system according to claim 6, wherein the heating film extends over at least 90% of the at least one surface of the cooling body.

8. The air-conditioning system according to claim 1, wherein to cool the vehicle components of the first circuit, a chiller is connected to the first circuit.

9. The air-conditioning system according to claim 8, wherein the at least one cooling body is arranged in the first circuit upstream of the chiller and downstream of the first vehicle component.

10. The air-conditioning system according to claim 1, further comprising at least one third vehicle component which is coupled thermally to the first circuit,
    wherein the heating energy provided by the heating device is transferrable partially to the at least one third vehicle component to heat the at least one third vehicle component.

11. The air-conditioning system according to claim 10, further comprising a control device that is configured to divide the heating energy between the first vehicle component and the at least one third vehicle component.

12. The air-conditioning system according to claim 10, wherein the at least one third vehicle component is a heat transport medium-carrying second circuit which is coupled thermally to the first circuit,
    wherein the first circuit and the second circuit carry a coolant as the heat transport medium, and
    wherein the heating energy provided by the heating device is transferrable partially to the second circuit to heat the second circuit.

13. The air-conditioning system according to claim 12, further comprising a refrigerant-carrying refrigeration circuit via which the first circuit and the second circuit are thermally coupled,
    wherein the heating energy is transferrable from the first circuit into the second circuit via the refrigeration circuit.

14. The air-conditioning system according to claim 12, wherein the second circuit is configured for controlling a temperature of an interior compartment of the motor vehicle.

15. A motor vehicle comprising the air-conditioning system according to claim 1.

* * * * *